United States Patent

[11] 3,542,020

[72] Inventor John Andrew Bushman
London, England
[21] Appl. No. 726,705
[22] Filed May 6, 1968
[45] Patented Nov. 24, 1970
[73] Assignee W. Watson & Sons Limited
Bells Hill, Barnet, England
a British company
[32] Priority May 10, 1967
[33] Great Britain
[31] No. 21755/67

[54] FLUID FLOW DEVICES
12 Claims, 1 Drawing Fig.
[52] U.S. Cl. .................................................. 128/145.8,
128/29
[51] Int. Cl. .................................................. A62b 7/00

[50] Field of Search ........................................... 128/29,
145, 145.8, 53, 145.6

[56] References Cited
UNITED STATES PATENTS
3,265,062 8/1966 Hesse .......................... 128/145.8
3,262,446 7/1966 Stoner ......................... 128/29

Primary Examiner—Adele M. Eager
Attorney—Watson, Cole, Grindle & Watson

ABSTRACT: A fluid flow device comprises a tubular body having a first inlet and an outlet. A second annular inlet concentric with the fluid passage in the body is outwardly flared towards the first inlet and outlet so that fluid flow through the second inlet causes a larger flow between the first inlet and outlet. Control apertures are provided on each side of the second inlet to control the direction of flow through the body.

Patented Nov. 24, 1970
3,542,020
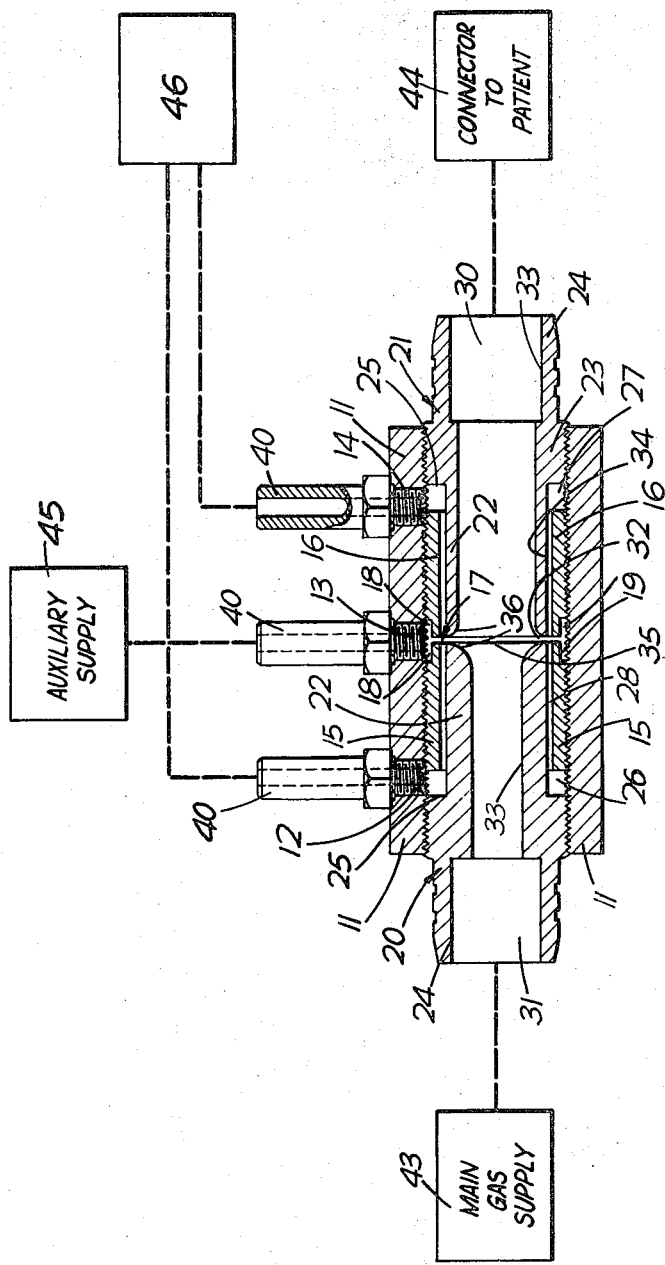
Inventor
J. A. Bushman
BY
Watson, Cole, Grindle + Watson
Attorneys

FLUID FLOW DEVICES

The invention relates to fluid flow devices.

The invention provides a fluid flow device comprising a hollow annular body surrounding a fluid flow passage between a first inlet and an outlet, and a second inlet passing through the wall of the body intermediate the first inlet and the outlet and arranged to supply fluid in more than one direction substantially perpendicular to the direction of said passage, the mouth of the second inlet adjacent the passage being outwardly flared towards both the first inlet and the outlet and the arrangement being such that when fluid is passed through the second inlet to the passage fluid is caused to flow along the passage between the first inlet and the outlet and the direction of flow along the passage is reversible.

Preferably control ports are provided in communication with the second inlet adjacent the said mouth, one port being on the first inlet side of the second inlet and another port being on the outlet side of the second inlet, the control ports, being arranged to provide an adjustable pressure to control, and reverse when required, the direction of fluid flow along said passage between the first inlet and the outlet.

Preferably the mouth of the second inlet extends around the entire periphery of the said fluid flow passage.

Preferably the second inlet includes an annular inlet passageway surrounding the said fluid flow passage and opening into a continuous annular mouth.

Preferably the two control apertures are connected to annular control passageways which open continuously into the annular inlet passageway.

Preferably the annular passageway is concentric with the said fluid flow passage and preferably the control passageways are concentric with the said fluid flow passage.

The invention includes a reversible pump for pumping air or gas, including a fluid flow device as aforesaid.

The invention also includes a medical ventilator for passing air or gas to or from a patient, including a fluid flow device as aforesaid, one end of the fluid flow passage being adapted to be connected to a patient and the other end being adapted to be connected to an air or gas supply or to exhaust.

A specific embodiment of the invention will now be described by way of example and with reference to the accompanying drawing which shows a fluid flow device for a medical ventilator embodying the invention.

The device shown in the drawing has a hollow body comprising a straight tubular open ended sleeve 11 formed with three screw threaded apertures 12, 13 and 14 passing through it. The internal surface of the sleeve 11 is screw threaded along its entire length. Two externally threaded short sleeve members 15 and 16 are screw threadedly engaged with the interior of the sleeve 11 so that their inner edges are separated by a short gap 17. Each of the sleeve members 15 and 16 has at its inner edge a part 18 of reduced external diameter spaced away from the sleeve 11 so as to form between the members 15 and 16 an annular passageway 19 communicating with the aperture 13. Also screw threadedly engaged with the interior of the sleeve 11 are two end tube members 20 and 21. The tube members 20 and 21 each have an inner tube part 22 of reduced external diameter, a central part 23 which is externally screw threaded and fits closely inside the sleeve 11 and an outer tapered part 24 adapted to receive as a push fit a flexible pipe. A shoulder 25 is formed at the junction of the parts 22 and 23. The tube members 20 and 21 are screwed into the sleeve 11 until their inner edges are separated by the gap 17. The shoulders 25 are spaced axially from the sleeve members 15 and 16 so as to form between them annular control passageways 26 and 27 which communicate with the apertures 12 and 14 respectively. The inner tube parts 22 are spaced radially from the sleeve members 15 and 16 to form annular control passageways 28 which interconnect the gap 17 and passageways 26 and 27.

The bore through the tube members 20 and 21 forms a fluid passage between a first inlet 31 and an outlet 30. The aperture 13, annular passageway 19 and annular gap 17 form a second inlet which has an annular mouth 32 between the tube members 20 and 21. The mouth 32 is outwardly flared towards both the first inlet 31 and the outlet. In the example shown in the drawing the outward flaring is caused by rounding the ends of the tube members 20 and 21. In each of the tube members 20 and 21 the inner surface 33 starts to curve towards the outer periphery 34 just short of the end 35 and continues in a smooth curve 36 extending right to the outer periphery 34. The external diameters of the inner parts 22 of the tube members 20 and 21 are equal but the bore through the tube member 21 is larger than that through the tube member 20.

Cylindrical tube connecters 40 each having a screw threaded boss at one end are screw threadedly engaged with the apertures 12, 13 and 14 so that the tube connecters project away from the sleeve 11.

In use, if both apertures 12 and 14 are open to atmosphere, air when passed in the aperture 13 through the second inlet under pressure causes a large volume of air to be sucked in the inlet 31 and blown out at the outlet 30 at relatively low pressure. Air entering the second inlet passes around the curved surface 36 on the tube member 21 and causes a large volume of air from the inlet 31 to be entrained with it and carried along the fluid passage between the first inlet 31 and the outlet 30. A negative pressure bubble is formed on the curved wall 36 of the tube member 21 and this causes the direction or air flow to be retained from left to right in the drawing.

The direction of flow may be reversed by passing air in the aperture 14 to raise the air pressure in the control passageway 28 surrounding the tube member 21 higher than that in the passageway 28 surrounding the tube member 20. This destroys the negative pressure bubble on the member 21 and air entering the second inlet will then pass to the opening 31 which now acts as an outlet. A large volume of air is then sucked in the opening 30, now acting as an inlet, and expelled from the opening 31. A negative pressure bubble is formed on the curved part 36 of the tube member 20 to retain the direction of air flow from right to left in the drawing. Flow direction will remain like that until the pressure at aperture 12 is increased relative to that at aperture 14, so as to cause the negative pressure bubble on member 20 to be destroyed with consequent reversal of flow direction between the apertures 30 and 31.

It will therefore be seen that by supplying air to the second inlet from an auxiliary supply 45 at a low volume rate, a large volume rate of air flow is obtained between the openings 30 and 31. Furthermore, the direction of flow between the openings 30 and 31 is reversible and is controlled by adjusting the pressures at the apertures 12 and 14.

In a medical ventilator, the patient may be connected to the outlet 30 by means of a mask device 44 coupled to the outlet 30. The inlet 31 can be connected to a main supply 43 of air, or oxygen or anaesthetic gas or to exhaust. The direction of flow through the device may be reversed between inhalation and exhalation cycles by feeding to the apertures 12 and 14 the pressure developed in the patient's airway. A connecting device 46 is provided to connect the apertures 12 and 14 to the patient's airway. Alternatively, the inhalation and exhalation cycles may be determined by a timing device alternately blocking the apertures 12 and 14 and allowing the air entrained in the control passageways to effect switching of the direction of flow.

By arranging for the mouth 32 of the second inlet to be annular and open into the fluid passage, between the inlet 31 and outlet 30, on all sides, a large entrainment effect is produced in entraining air or gas from the opening 31 or 30.

It will be seen that the second inlet supplies fluid perpendicular to the direction of the bore between the inlet 31 and outlet 30, and in all radial directions.

In the example shown in the drawings, the external diameter of the sleeve 11 is about 1½ inches, the length of the sleeve 11 is 3 inches. The curved surfaces 36 are curved as part of a circle.

The invention is not restricted to the details of the foregoing example. The tapered parts 24 of the tube members 20 and 21 may be ridged externally to improve the sealing connection with a flexible tube.

I claim:

1. A fluid flow device comprising a hollow annular body surrounding a fluid flow passage for reversible flow between a first aperture and a second aperture, an inlet passing through the wall of the body intermediate the two apertures and arranged to supply fluid in more than one direction substantially perpendicular to the direction of the passage, the mouth of the inlet adjacent the passage being outwardly flared towards both the first and second apertures, the arrangement being such that, when fluid is passed through the inlet to the passage, fluid is caused to flow along the passage between the apertures, the direction of said flow being stable but reversible, control ports in communication with said inlet adjacent said mouth, one control port being on the first aperture side of said inlet and the other control port being on the second aperture side of said inlet, the control ports being arranged to provide an adjustable pressure to control, and reverse when required, the direction of fluid flow along said passage between the first and second apertures.

2. A fluid flow device as claimed in claim 1 in which the mouth of said inlet extends around the entire periphery of the said fluid flow passage.

3. A fluid flow device as claimed in claim 2 in which said inlet includes an annular inlet passageway surrounding the said fluid flow passage and openings into a continuous annular mouth.

4. A fluid flow device as claimed in claim 3 in which the two control ports are connected to annular control passageways which open continuously into the annular inlet passageway.

5. A fluid flow device as claimed in claim 4 in which the annular inlet passageway is concentric with the said fluid flow passage and the control passageways are concentric with the said fluid flow passage.

6. A fluid flow device comprising a hollow tubular body member, having a first inlet at one end, an outlet at the other end, a fluid passage interconnecting the first inlet and outlet, a second inlet passing through the wall of the body member and two control apertures on opposite sides of the second inlet, the device further comprising first and second tubular inserts positioned within the body member at opposite ends of the body member the inner ends of the tubular inserts being spaced apart to form an annular inlet passageway communicating with said second inlet, and the said inner ends being of reduced diameter so as to provide annular control passageways between said inner ends and the body member connecting the said apertures to the said annular inlet passageway, the inner end walls of each tubular insert being curved so that the mouth of the annular inlet passageway is outwardly flared towards both the said first inlet and the outlet, the arrangement being such that when fluid is passed through the said second inlet, fluid is caused to flow between the first inlet and the outlet.

7. A fluid flow device as claimed in claim 6 in which sleeve members are positioned within the body member surrounding the smaller inner ends of each tubular insert and spaced from the tubular inserts so as to provide the annular control passageways between the said inner ends and the said sleeves.

8. A fluid flow device as claimed in claim 6 in which the outer ends of the tubular inerts project outwardly from the body member and provide pipe connections.

9. A bistable fluid flow device comprising a hollow annular body surrounding a fluid passage for reversible flow between a first and a second aperture, an inlet passing through the wall of the body intermediate the two apertures and arranged to supply fluid in more than one direction substantially perpendicularly to the direction of said passage, the mouth of the inlet adjacent the passage being outwardly flared towards both the first and second apertures and the arrangement being such that when fluid is passed through the inlet to the passage, further fluid is caused to flow along the passage between the two apertures, the direction of said flow along the passage being stable in one direction during increase of the pressure difference between the two apertures up to a maximum pressure differential at which a point of instability occurs to reverse the flow direction, said reversed flow direction remaining stable during decrease of said pressure differential to a minimum at which a further point of instability occurs to revert the flow in the passageway to its original direction.

10. A fluid flow device as claimed in claim 9, wherein the flared surface of the mouth is formed as circular arcs, the flaring on the sides of the mouth nearer the first aperture having a different radius of curvature from the flaring on the other side of the mouth.

11. A fluid flow device as claimed in claim 9, wherein a control passage is provided leading into said mouth on the side of the mouth nearer the first aperture.

12. A fluid flow device as claimed in claim 9, wherein two control passages are provided leading into said mouth, one on the side of the mouth nearer the first aperture and the other on the side of the mouth nearer the second aperture.